(12) United States Patent
Yang et al.

(10) Patent No.: US 12,202,143 B2
(45) Date of Patent: Jan. 21, 2025

(54) ROBOT CONTROL METHOD, APPARATUS AND DEVICE, STORAGE MEDIUM AND PROGRAM PRODUCT

(71) Applicant: TENCENT TECHNOLOGY (SHENZHEN) COMPANY LIMITED, Guangdong (CN)

(72) Inventors: Rui Yang, Guangdong (CN); Lanqing Li, Guangdong (CN); Dijun Luo, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 220 days.

(21) Appl. No.: 17/957,710

(22) Filed: Sep. 30, 2022

(65) Prior Publication Data

US 2023/0035150 A1    Feb. 2, 2023

Related U.S. Application Data

(63) Continuation of application No. PCT/CN2021/124168, filed on Oct. 15, 2021.

(30) Foreign Application Priority Data

Nov. 13, 2020    (CN) .......................... 202011271477.5

(51) Int. Cl.
    *B25J 9/16*    (2006.01)
(52) U.S. Cl.
    CPC ........... *B25J 9/1661* (2013.01); *B25J 9/1664* (2013.01)
(58) Field of Classification Search
    CPC ........ B25J 9/1661; B25J 9/1664; B25J 9/163; B25J 9/1612; B25J 9/08; B25J 9/1602; B25J 9/1679; G05B 2219/40499
    See application file for complete search history.

(56) References Cited

U.S. PATENT DOCUMENTS 10,800,040 B1 * 10/2020  Beckman ............... B25J 9/1605
10,926,408 B1 *  2/2021  Vogelsong ............... B25J 9/163
(Continued)

FOREIGN PATENT DOCUMENTS

CN    106393102 A    2/2017
CN    107767760 A    3/2018
(Continued)

OTHER PUBLICATIONS

Prizel et al., Neural Episodic Control, 2017, Proceedings of the 34th International Conference on Machine Learning, pp. 1-10 (Year: 2017).*

(Continued)

*Primary Examiner* — Sze-Hon Kong
(74) *Attorney, Agent, or Firm* — Sughrue Mion, PLLC

(57) ABSTRACT

Embodiments of the disclosure provide a robot control method, apparatus and device, a computer storage medium and a computer program product and relate to the technical field of artificial intelligence. The method includes: acquiring environment interaction data and an actual target value, indicating a target that is actually reached by executing an action corresponding to action data in the environment interaction data; determining a return value after executing the action according to state data, action data and the actual target value at the first time of two adjacent times; updating a return value in the environment interaction data by using the return value after executing the action; training an agent corresponding to a robot control network by using the updated environment interaction data, and controlling the action of a target robot by using the trained agent.

20 Claims, 13 Drawing Sheets

(56) References Cited

U.S. PATENT DOCUMENTS

| | | | |
|---|---|---|---|
| 11,554,483 B2* | 1/2023 | Davidson | B25J 9/1697 |
| 11,610,153 B1* | 3/2023 | Herzog | G06N 3/006 |
| 11,720,796 B2* | 8/2023 | Uria-Martínez et al. | G06N 3/08 706/25 |
| 11,861,490 B1* | 1/2024 | Gupta | G06V 10/774 |
| 12,050,438 B1* | 7/2024 | Ebrahimi Afrouzi | G05B 13/0205 |
| 12,070,847 B1* | 8/2024 | Ebrahimi Afrouzi | B25J 9/1684 |
| 2018/0157973 A1 | 6/2018 | El-Yaniv et al. | |
| 2018/0281180 A1* | 10/2018 | Yamamoto | B25J 9/163 |
| 2019/0354869 A1 | 11/2019 | Warde-Farley et al. | |
| 2020/0334565 A1 | 10/2020 | Tresp et al. | |
| 2020/0363813 A1* | 11/2020 | He | G05D 1/0221 |
| 2020/0368906 A1* | 11/2020 | Tozeto Ramos | G06N 3/084 |
| 2021/0237266 A1* | 8/2021 | Kalashnikov | B25J 9/1602 |
| 2021/0283771 A1* | 9/2021 | Ijiri | B25J 9/1635 |
| 2021/0325894 A1* | 10/2021 | Faust | G06N 3/008 |
| 2022/0105629 A1* | 4/2022 | Natarajan | G05B 19/4189 |
| 2023/0073326 A1* | 3/2023 | Schrittwieser | G06F 18/214 |
| 2023/0355332 A1* | 11/2023 | Nagao | A61B 34/70 |

FOREIGN PATENT DOCUMENTS

| | | | | |
|---|---|---|---|---|
| CN | 108693851 A | 10/2018 | | |
| CN | 110673602 A | 1/2020 | | |
| CN | 111026272 A | 4/2020 | | |
| CN | 111421538 A | 7/2020 | | |
| CN | 112476424 A | 3/2021 | | |
| CN | 106393102 B | * 6/2021 | ............ | B25J 9/1602 |
| JP | 2020-82314 A | 6/2020 | | |
| WO | 2018/154100 A1 | 8/2018 | | |

OTHER PUBLICATIONS

International Search Report for PCT/CN2021/124168 dated Jan. 6, 2022.
Office Action issued Mar. 11, 2024 in Japanese Application No. 2023-515831.
Asuto Taniguchi, et al., "Goal-Conditioned Reinforcement Learning with Extended Floyd-Warshall method", No. 20-2 Proceedings of the 2020 JSME Conference on Robotics and Mechatronics, Japan Society of Machinery, 2020, No. 5 (4 pages).
Extended European Search Report issued Mar. 22, 2024 in Application No. 21890890.3.
"System Simulation Techniques and Applications Thereof", 2004 Academic Proceedings, vol. 6, Chinese Academic Technical University Press, Aug. 31, 2004, pp. 76-77, (5 pages total).
Communication issued Sep. 14, 2024 in Chinese application No. 202011271477.5.

* cited by examiner

ROBOT CONTROL METHOD, APPARATUS AND DEVICE, STORAGE MEDIUM AND PROGRAM PRODUCT

CROSS-REFERENCE TO RELATED APPLICATION(S)

This application is a bypass continuation application of International Application No. PCT/CN2021/124168, filed Oct. 15, 2021, which claims priority to Chinese Patent Application No. 202011271477.5 filed on Nov. 13, 2020, the disclosures of which are herein incorporated by reference in their entireties.

FIELD

Embodiments of the disclosure relate to the technical field of artificial intelligence and Internet, and particularly relate to a robot control method, apparatus and device, a computer storage medium and a computer program product.

BACKGROUND

At present, for controlling a robot, one implementation method is a deep reinforcement learning control algorithm based on a priority experience replay mechanism. In this method, the state information of an object operated by the robot is used to calculate the priority, and a deep reinforcement learning method is used to complete an end-to-end robot control model so that a deep reinforcement learning agent learn autonomously in the environment and complete specified tasks. Another implementation method is a kinematic self-grasping learning method based on a simulation industrial robot, which belongs to the field of computer-aided manufacturing. Based on the simulation environment, robot grasping training is carried out by using the reinforcement learning theory, and the simulation robot automatically acquires the position information of an object by using images captured by cameras, and determines the grasping position of a grasping tool at the tail end of the robot. At the same time, an image processing method based on reinforcement learning determines the posture of the grasping tool according to the shape and placement state of the grasped object in the observed image, and finally objects of varying shapes and random placement are successfully grasped.

However, the implementation methods in the related art typically require training a model to complete a feature task, are poor in generalization, and have a slow training process for robot tasks.

SUMMARY

Embodiments of the disclosure provide a robot control method, apparatus and device, a computer storage medium and a computer program product, in which the utilization rate of data may be increased, the training of an agent may be accelerated, and a large number of targets may be trained at the same time, all tasks in a certain target space may be completed through a model, and the generalization of the model may be improved.

An embodiment of the disclosure provides a robot control method, including:
acquiring environment interaction data, the environment interaction data at least comprising state data indicating a state of an environment in which a target robot is currently located, action data indicating an action to be executed by the target robot, return values and target values at two adjacent times, the return values being reward values to be acquired by the target robot after executing the action, the target values being preset targets to be reached by the target robot;
acquiring an actual target value, indicating a target actually reached in executing the action corresponding to the action data;
determining a return value in executing the action according to the state data, the action data and the actual target value at a first time of the two adjacent times;
updating the return value in the environment interaction data by using the return value in executing the action to obtain updated environment interaction data;
training an agent corresponding to a robot control network by using the updated environment interaction data; and
controlling the action of the target robot by using the trained agent.

An embodiment of the disclosure provides a robot control apparatus, including:
at least one memory configured to store program code; and
at least one processor configured to read the program code and operate as instructed by the program code, the program code comprising:
first acquiring code configured to cause the at least one processor to acquire environment interaction data, the environment interaction data at least comprising state data indicating a state of an environment in which a target robot is currently located, action data indicating an action to be executed by the target robot, return values and target values at two adjacent times, the return values being reward values to be acquired by the target robot after executing the action, the target values being preset targets to be reached by the target robot;
second acquiring code configured to cause the at least one processor to acquire an actual target value, indicating a target actually reached in executing the action corresponding to the action data;
determining code configured to cause the at least one processor to determine a return value in executing the action according to the state data, the action data and the actual target value at a first time of the two adjacent times;
updating code configured to cause the at least one processor to update the return value in the environment interaction data by using the return value in executing the action to obtain updated environment interaction data;
training code configured to cause the at least one processor to train an agent corresponding to a robot control network by using the updated environment interaction data; and
controlling code configured to cause the at least one processor to control the action of the target robot by using the trained agent.

An embodiment of the disclosure further provides a computer program product or a computer program. The computer program product or the computer program includes computer instructions, the computer instructions being stored in a computer-readable storage medium, where a processor of a computer apparatus reads the computer instruction from the computer-readable storage medium, and the processor is used for executing the computer instruction to implement the robot control method provided by this embodiment of the disclosure.

An embodiment of the disclosure provides a robot control device, including:

a memory, configured to store executable instructions; and a processor, configured to perform, when executing the executable instructions stored in the memory, the robot control method provided in the embodiments of the disclosure.

An embodiment of the disclosure provides a computer-readable storage medium, storing executable instructions, and being configured to implement, when causing the processor to execute the executable instructions, the robot control method provided in the embodiments of the disclosure.

DETAILED DESCRIPTION

Figure 1A:
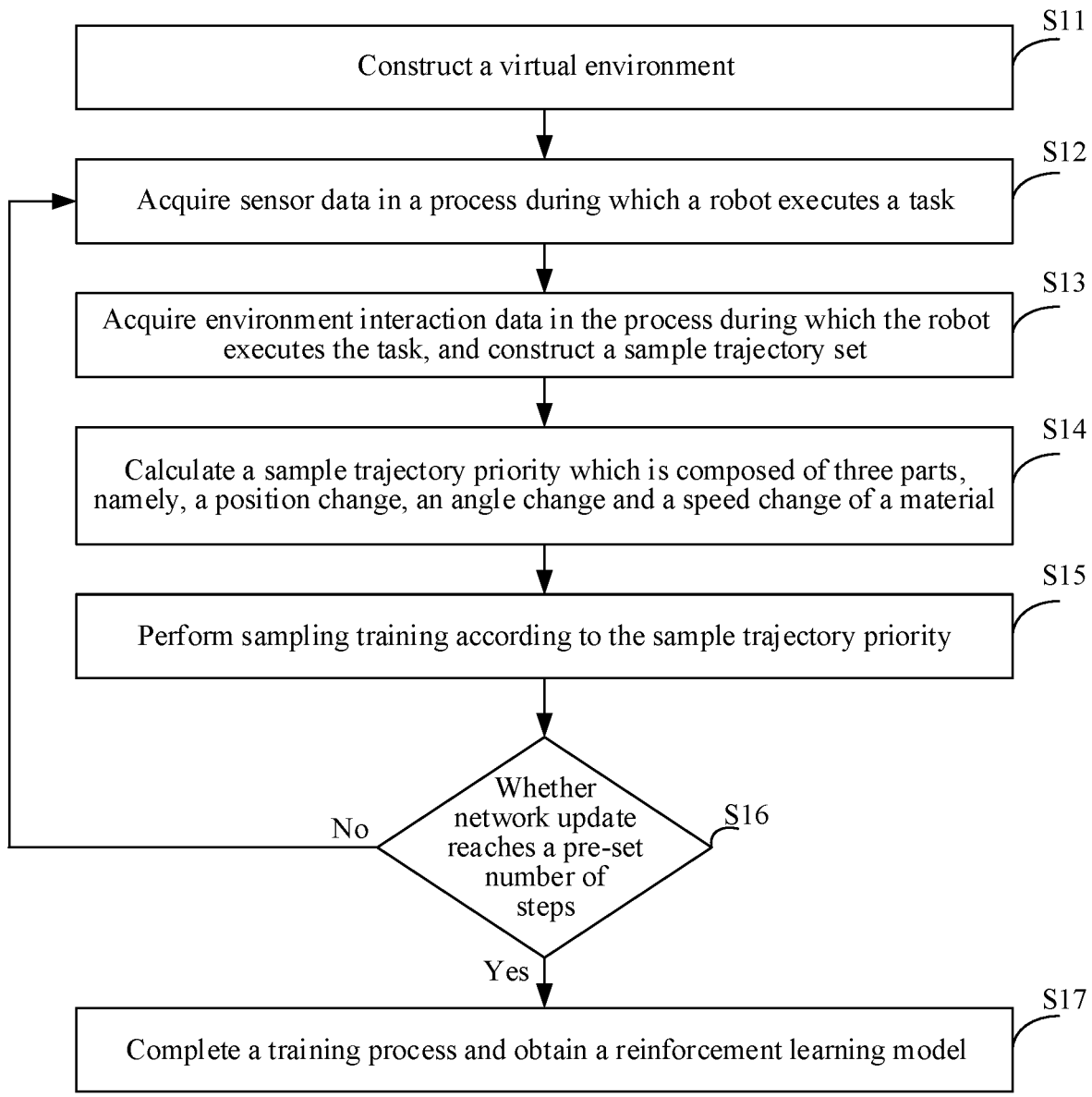
FIG. 1A is a schematic diagram of a method for obtaining a reinforcement learning model to be used in a robot control method provided by an embodiment of the disclosure.

To make the objectives, technical solutions, and advantages of the disclosure clearer, the following describes the disclosure in further detail with reference to the accompanying drawings. The described embodiments are not to be considered as a limitation to the disclosure. All other embodiments obtained by a person of ordinary skill in the art without creative efforts shall fall within the protection scope of the disclosure.

In the following descriptions, related "some embodiments" describe a subset of all possible embodiments. However, it may be understood that the "some embodiments" may be the same subset or different subsets of all the possible embodiments, and may be combined with each other without conflict. Unless otherwise defined, meanings of all technical and scientific terms used in the embodiments of the disclosure are the same as or similar to those understood by a person skilled in the art to which the embodiments of the disclosure belong. Terms used in the embodiments of the disclosure are merely intended to describe objectives of the embodiments of the disclosure, but are not intended to limit the disclosure.

Before explaining the schemes of the embodiments of the disclosure, the nouns and specific terms involved in the embodiments of the disclosure are firstly explained:

1) Reinforcement Learning: It belongs to the category of machine learning, is generally used for solving a sequence decision-making problem, and mainly includes two components: an environment and an agent, where the agent selects an action for execution according to the state of the environment, the environment transitions to a new state according to the action of the agent and feeds back a numerical return, and the agent continuously optimizes a policy according to the return fed back by the environment.

2) Off-line Policy: It is a method different from a class of action policies for collecting data and updated target policies in reinforcement learning, the off-line policy generally requiring the use of experience replay techniques.

3) Experience Replay: It is a technique used by an off-line policy algorithm in reinforcement learning. It maintains an experience pool to store data of interaction between the agent and the environment. When the policy is trained, the data is sampled from the experience pool to train a policy network. The way of experience replay makes the data utilization efficiency of the off-line policy algorithm higher than that of an on-line policy algorithm.

4) Multi-target Reinforcement Learning: A common reinforcement learning task is to accomplish a specific task, but there are often a large number of tasks in robot control, such as moving a mechanical arm to a position in space, and it may be desirable for the policy learned by the agent to reach any target position in the target space, thus introducing multi-target reinforcement learning. Multi-target reinforcement learning refers to completing multiple targets simultaneously.

5) Hindsight Experience Replay: It is a method for multi-target reinforcement learning, and by modifying the expected target of the data in the experience pool to the completed target, the hindsight experience replay may greatly improve the utilization efficiency of failure data.

6) Foresight Experience replay: The idea of foresight experience replay comes from Monte Carlo and timing difference value function estimation, and the estimation of a value function is accelerated by expanding a multi-step expected cumulative return.

7) Off-line Policy Deviation: When a foresight experience replay method is used directly in the off-line policy algorithm, the common foresight experience replay will cause the accumulation of off-line policy deviation due to the difference between a behavior strategy and a target strategy, which may seriously affect the strategy learning of the agent.

FIG. 1A is a schematic diagram of a method for obtaining a reinforcement learning model to be used in a robot control method provided by an embodiment of the disclosure; this method is a deep reinforcement learning control algorithm based on a priority experience replay mechanism. The state information of an object operated by a robot is used to calculate the priority, and a deep reinforcement learning method is used to complete training of an end-to-end robot control model, and this method allows an agent of deep reinforcement learning to learn autonomously and complete specified tasks in the environment. In the training process, the state information of a target object is collected in real time, and the priority of experience replay is calculated according to the state information, then data in an experience replay pool is sampled according to the priority, and a strong reinforcement learning algorithm is used to learn the sampled data to obtain a control model. On the premise of ensuring the robustness of a deep reinforcement learning algorithm, this method uses environmental information to the maximum extent, improves the effect of the control model and accelerates a learning convergence speed. As shown in FIG. 1A, the method includes the following steps.

Step S11: Construct a virtual environment.

Step S12: Acquire sensor data in a process during which a robot executes a task.

Step S13: Acquire environment interaction data in the process during which the robot executes the task, and construct a sample trajectory set.

Step S14: Calculate a sample trajectory priority which includes three parts, namely, a position change, an angle change and a speed change of a material.

Step S15: Perform sampling training according to the sample trajectory priority.

Step S16: determine whether network update reaches a pre-set number of steps.

Step S17: If yes, complete a training process and obtaining a reinforcement learning model.

Figure 1B:
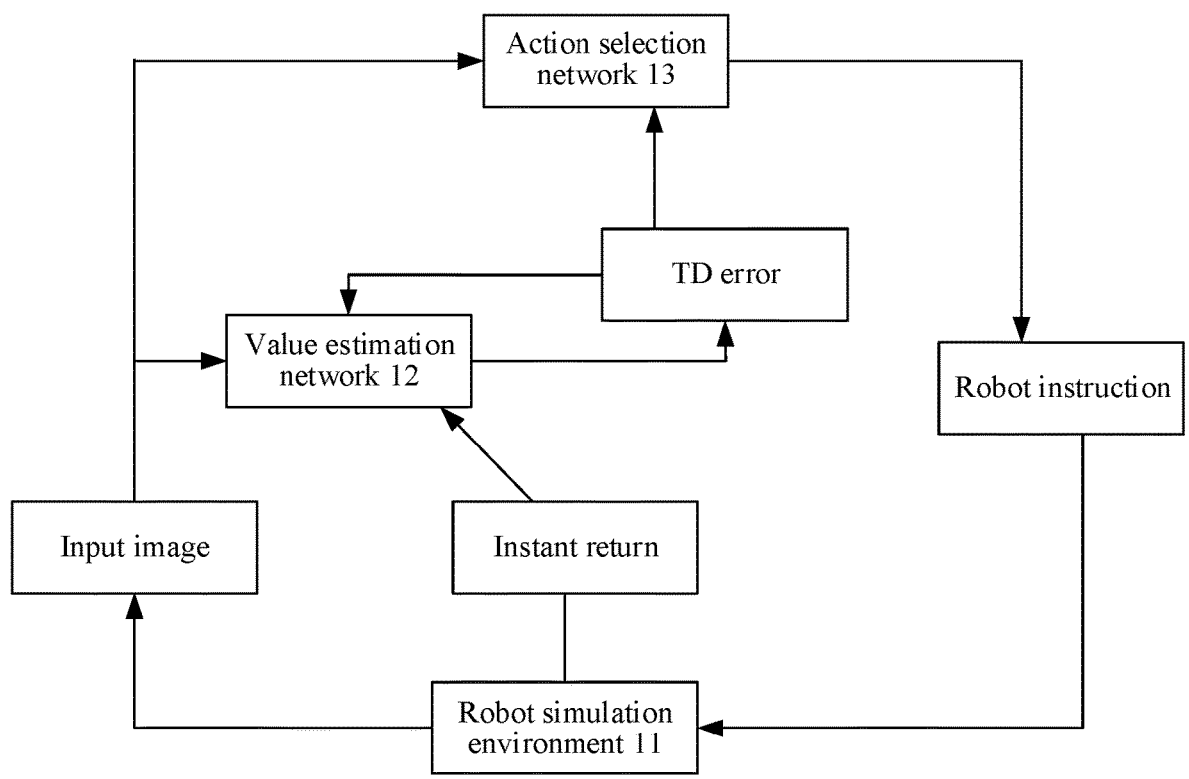
FIG. 1B is a schematic diagram of a grasping technique to be used in a robot control method provided by an embodiment of the disclosure.

FIG. 1B is a schematic diagram of a grasping technique to be used in a robot control method provided by an embodiment of the disclosure, and the method is a kinematic self-grasping learning method and system based on a simulation industrial robot, and belongs to the field of computer-aided manufacturing. According to the method, based on the simulation environment, robot grasping training is carried out by using a reinforcement learning theory, and a simulation robot automatically acquires the position information of an object by images captured by cameras, and determines the grasping position of a grasping tool at the tail end of the robot according to the position information. At the same time, an image processing method based on reinforcement learning determines the posture of the grasping tool according to the shape and placement state of the grasped object in an observed image, and finally objects of varying shapes and random placement are successfully grasped. The grasping technique in this method may be applied to many industrial and living scenes. It may simplify the programming complexity of grasping work of a traditional robot, improve the expansibility of a robot program, and greatly widen the application range of the robot and improve the work efficiency in actual production. As shown in FIG. 1B, a whole robot control system includes a robot simulation environment 11, a value estimation network 12 and an action selection network 13, and through interaction among the robot simulation environment 11, the value estimation network 12 and the action selection network 13, training on a network in the whole system may be performed.

However, the above two methods have at least the following problems. In general, each feature task needs to train a model, and the generalization of the model is low. Information about hindsight experience replay is not utilized, and learning from failure data typically cannot be achieved; Information about foresight experience replay is not utilized, typically a single-step timing difference method is used for training, the training efficiency is low and a trained agent is low in accuracy.

To this end, an embodiment of the disclosure provides a robot control method, and the method is a multi-target reinforcement learning robot control technology incorporating foresight experience replay and hindsight experience replay, and may greatly improve the utilization efficiency of data for agent training, and at the same time may alleviate the influence of off-line policy deviation. The method provided by this embodiment of the disclosure may simultaneously train a large number of targets, and a model obtained by training may complete all the tasks in a certain target space. Furthermore, hindsight experience replay is used to improve the utilization of the failure data, which accelerates the training of robot tasks. At the same time, multi-step return expansion using foresight experience replay accelerates learning of a value function and training of the agent.

In an example embodiment, the robot control method may acquire environment interaction data, the environment interaction data at least including state data, action data, return values and target values at two adjacent times; acquire an actual target value which is actually completed in executing an action corresponding to the action data; determine a return value after executing the action according to the state data, the action data and the actual target value at the first time of the two adjacent times; update the return value in the environment interaction data by using the return value after executing the action to obtain updated environment interaction data; then train an agent corresponding to a robot control network by using the updated environment interaction data; and finally, control the action of a target robot by using the trained agent. In this way, the way of hindsight experience replay is used to improve the utilization rate of data, which accelerates the training of the agent, and since the environment interaction data includes the target values, a large number of targets may be trained simultaneously, and a model obtained by training may complete all the tasks in a certain target space.

Exemplary applications of a robot control device provided by an embodiment of the disclosure are described below. In one implementation method, the robot control device provided by this embodiment of the disclosure may be implemented as any electronic device or agent itself, such as a notebook computer, a tablet computer, a desktop computer, a mobile device (e.g., a mobile phone, a portable music player, a personal digital assistant, a dedicated messaging device, and a portable gaming device), a smart robot, etc. In another implementation method, the robot control device provided by this embodiment of the disclosure may also be implemented as a server. In the following, an exemplary application when the robot control device is implemented as the server will be described, an agent may be trained by means of the server, and by means of the trained agent, the action of a target robot is controlled.

Figure 2:
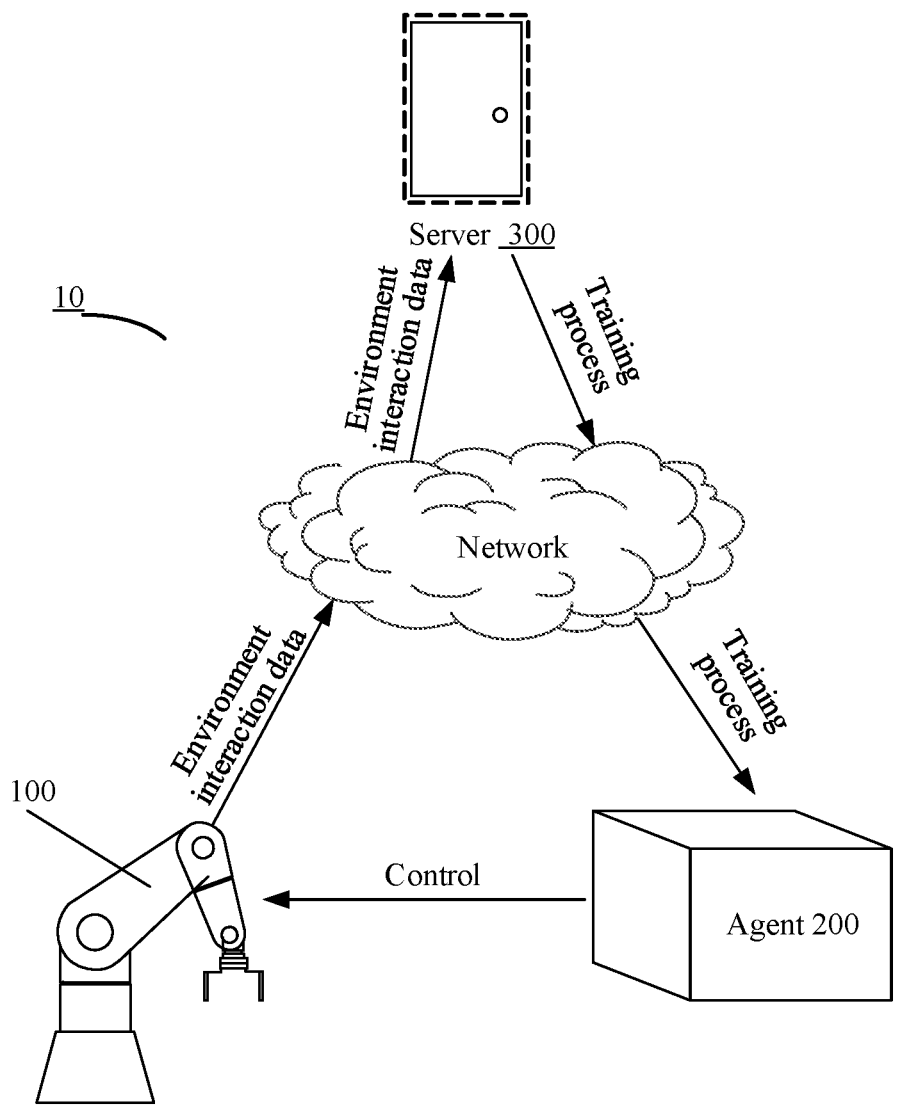
FIG. 2 is a schematic diagram of an architecture of a robot control system provided by an embodiment of the disclosure.

FIG. 2 is a schematic diagram of an architecture of a robot control system 10 provided by an embodiment of the disclosure. In order to realize the training of the agent, the robot control system 10 provided by this embodiment of the disclosure includes a robot 100, an agent 200 and a server 300, where the server 300 acquires environment interaction data of the robot 100, the environment interaction data at least including state data, action data, return values and target values at two adjacent times, where the state data may be state data of the robot acquired by the robot 100 via a sensor, and the action data is data corresponding to an action executed by the robot 100; the return value is a reward value acquired by the robot after executing the action, and the target value is a preset target to be reached by the robot. The server 300 further acquires an actual target value which is actually completed by the robot 100 in executing an action corresponding to the action data, and after acquiring the environment interaction data and the actual target value, the server 300 determines a return value after the robot 100 executes the action according to the state data, the action data and the actual target value at the first time of the two adjacent times; and updates the return value in the environment interaction data by using the return value after executing the action to obtain updated environment interaction data. The updated environment interaction data is used to train the agent 200 corresponding to a robot control network; and the action of a target robot is controlled by using the trained agent 200 after finishing training the agent 200.

The robot control method provided by this embodiment of the disclosure also relates to the technical field of artificial intelligence, and may be realized at least by a computer vision technology and a machine learning technology in an artificial intelligence technology, where, the computer vision technology (CV) is a science that studies how to make a machine "look", furthermore, the CV refers to using cameras and computers to replace human eyes for machine vision, such as target recognition, tracking and measurement, and further for graphic processing, so that computer processing is more suitable for images to be observed by human eyes or transmitted to an instrument for detection. As a scientific discipline, the CV studies related theories and technologies and attempts to establish an AI system that may obtain information from images or multidimensional data. The CV technologies generally include technologies such as image processing, image recognition, image semantic understanding (ISU), image retrieval, optical character recognition (OCR), video processing, video semantic understanding, video content/behavior recognition, three-dimensional object reconstruction, a three-dimensional (3D) technology, virtual reality, augmented reality, synchronous positioning, and map construction, and further include biological feature recognition technologies such as common face recognition and fingerprint recognition. Machine learning (ML) is a multi-field interdiscipline, involves in the probability theory, statistics, approximation theory, convex analysis, algorithmic complexity theory and many other disciplines, and specifically studies how computers simulate or achieve human learning behavior to acquire new knowledge or skills and reorganize existing knowledge structures to continuously improve its performance. The ML is the core of the AI, is a basic way to make the computer intelligent, and is applied to various fields of AI. The ML and deep learning (DL) generally include technologies such as an artificial neural network, a belief network, reinforcement learning, transfer learning, inductive learning, and learning from demonstrations. In this embodiment of the disclosure, a response to a network structure search request is implemented through machine learning techniques to automatically search for a target network structure, and to implement training and model optimization of controllers and score models.

Figure 3:
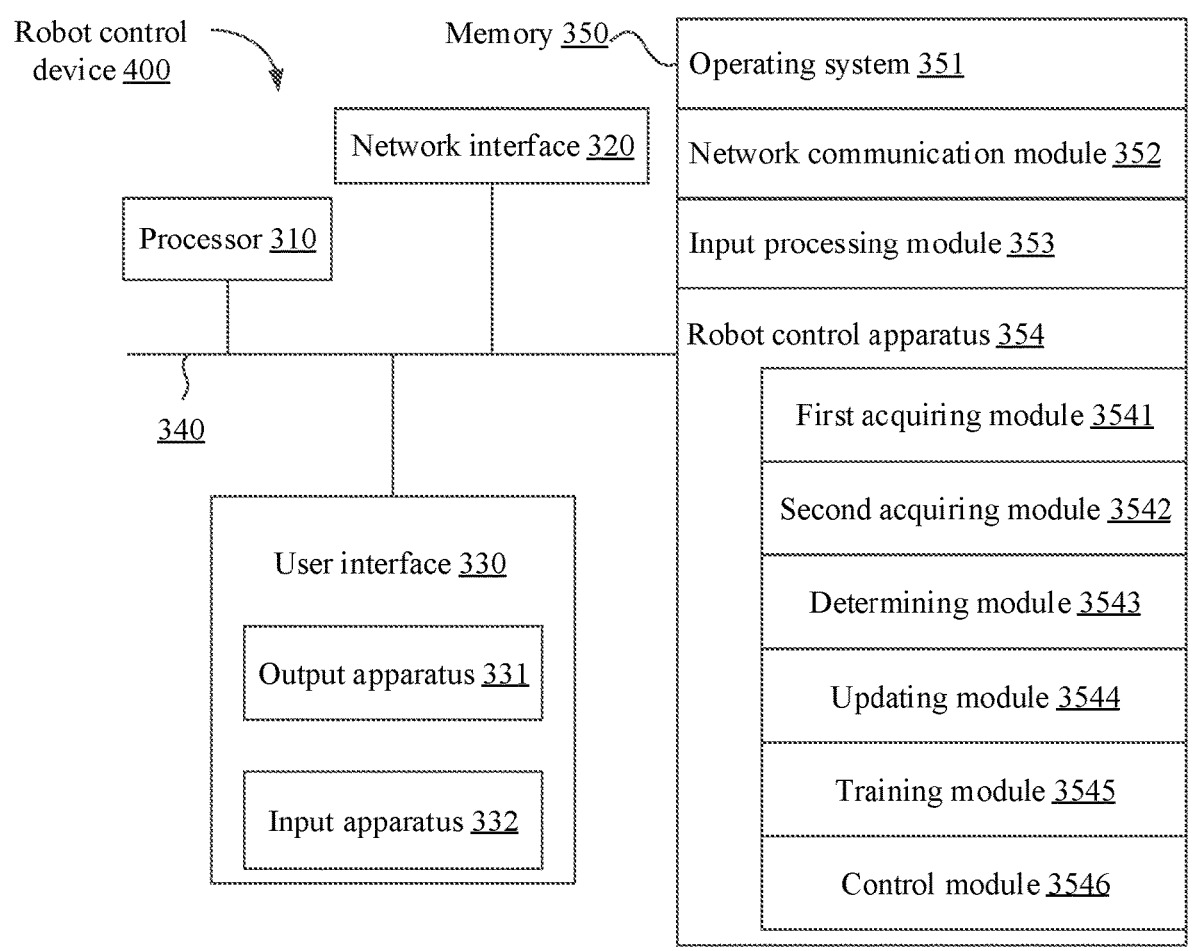
FIG. 3 is a schematic structural diagram of a server provided by an embodiment of the disclosure.

FIG. 3 is a schematic structural diagram of a robot control device 400 provided by an embodiment of the disclosure. In an example embodiment, the robot control device 400 may be the server 300 in FIG. 2, and by taking the robot control device 400 being the server 300 as shown in FIG. 2 as an example, the robot control device implementing the robot control method provided in this embodiment of the disclosure is described. The robot control device 400 as shown in FIG. 3 includes: at least one processor 310, a memory 350, at least one network interface 320, and a user interface 330. Components in the server 300 are coupled together by using a bus system 340. It may be understood that the bus system 340 is configured to implement connection and communication between these assemblies. In addition to a data bus, the bus system 340 further includes a power bus, a control bus, and a state signal bus. However, for ease of clear description, all types of buses are marked as the bus system 340 in FIG. 3.

The processor 310 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 330 includes one or more output apparatuses 331 that may display media content, including one or more loudspeakers and/or one or more visual display screens. The user interface 330 further includes one or more input apparatuses 332, including user interface components that facilitate inputting of a user, such as a keyboard, a mouse, a microphone, a touch display screen, a camera, and other input button and control.

The memory 350 may be a removable memory, a non-removable memory, or a combination thereof. Exemplary hardware devices include a solid-state memory, a hard disk drive, an optical disc drive, or the like. The memory 350 may include one or more storage devices physically away from the processor 310. The memory 350 may include a volatile memory or a non-volatile memory, or may include both a volatile memory and a non-volatile memory. The non-volatile memory may be a read-only memory (ROM). The volatile memory may be a random access memory (RAM). The memory 350 described in this embodiment of the disclosure is to include any other suitable type of memories. In some embodiments, the memory 350 may store data to support various operations. Examples of the data include a program, a module, and a data structure, or a subset or a superset thereof, which are described below by using examples.

An operating system 351 includes a system program configured to process various basic system services and perform a hardware-related task, for example, a framework layer, a core library layer, and a driver layer, and is configured to implement various basic services and process a hardware-related task.

A network communication module 352 is configured to reach other computing devices via one or more (wired or wireless) network interfaces 320, an exemplary network interface 320 including: Bluetooth, wireless fidelity (WiFi), a universal serial bus (USB), etc.

An input processing module 353 is configured to detect one or more user inputs or interactions from one of the one or more input apparatuses 332 and translate the detected input or interaction.

In some embodiments, the apparatus provided by this embodiment of the disclosure may be implemented in a mode of software, and FIG. 3 shows a robot control apparatus 354 stored in the memory 350, where the robot control apparatus 354 may be a robot control apparatus in the server 300, and may be software in the form of a program, a plug-in, etc. including the following software modules: a first acquiring module 3541, a second acquiring module 3542, a determining module 3543, an updating module 3544, a training module 3545 and a control module 3546, these modules are logical, and therefore, any combination or further division may be performed according to the realized functions. The following describes functions of the modules.

In some other embodiments, the apparatus provided in this embodiment of the disclosure may be implemented by using hardware. For example, the apparatus provided in this embodiment of the disclosure may be a processor in a form of a hardware decoding processor, programmed to perform the robot control method provided in the embodiments of the disclosure. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

Figure 4:
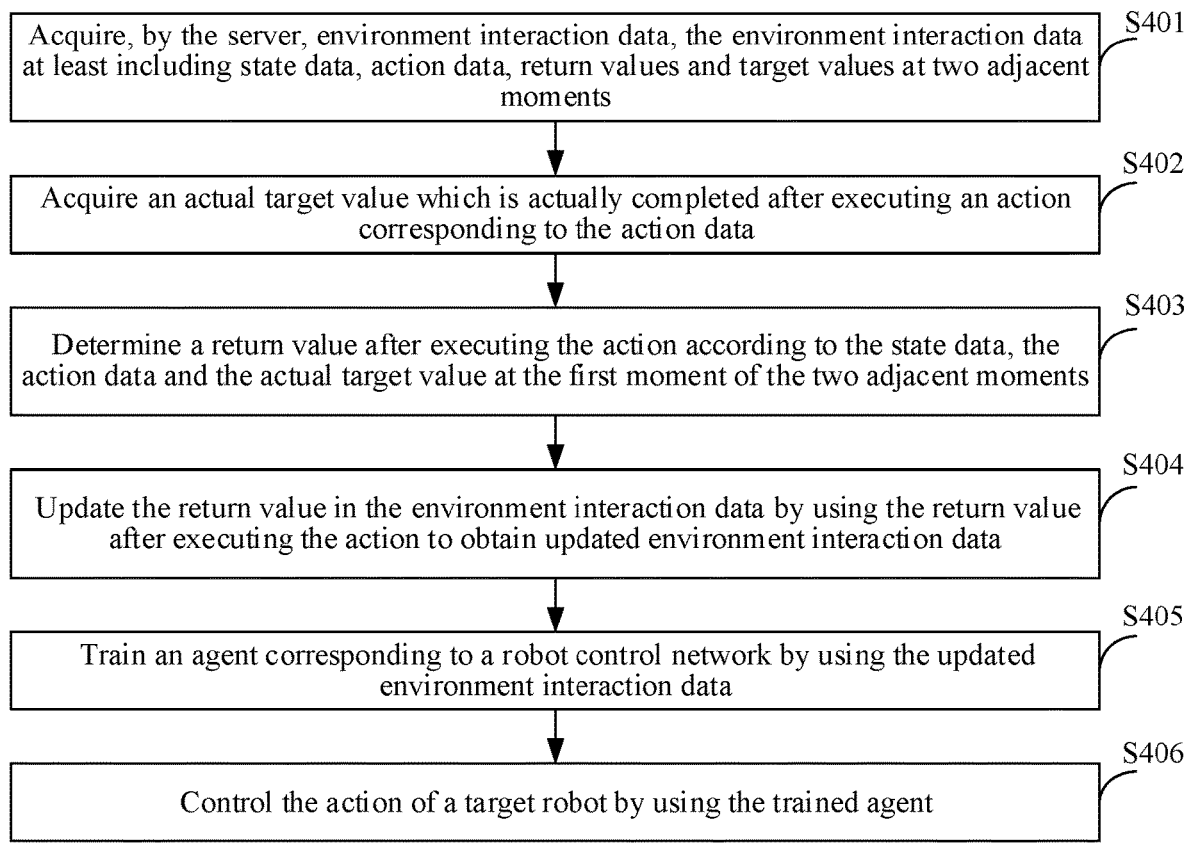
FIG. 4 is a schematic flowchart of a robot control method provided by an embodiment of the disclosure.

Hereinafter, the robot control method provided by this embodiment of the disclosure will be described with reference to the exemplary application of the robot control device 400 provided by this embodiment of the disclosure. The robot control method provided by this embodiment of the disclosure may be implemented by a server or a terminal alone, and may also be implemented by the server and the terminal in cooperation. FIG. 4 is a schematic flowchart of the robot control method provided by an example embodiment of the disclosure, and the robot control method will be described in conjunction with the steps shown in FIG. 4 based on an assumption that the robot control method is implemented by the server alone as an example.

Step S401: Acquire, by the server, environment interaction data, the environment interaction data at least including state data, action data, return values and target values at two adjacent times.

Here, the state data may be state data of a robot acquired by the robot through a sensor or state data of the environment in which the robot is currently located. The action data is data corresponding to an action executed by the robot, and the action may be an action already executed by the robot at a time before the current time, or an action to be executed at the next time after the current time, where the action may be an action which may be performed by any kind of robot, such as moving, grasping and sorting.

There is a mapping relationship between a state set corresponding to the state data of the environment and an action set corresponding to the action data, namely, when the robot observes a certain state in the environment, a specific action needs to be issued, and in each state, the probabilities of the robot issuing different actions are different. For example, in Weiqi games, the state set of the environment includes all possible game situations, the action set of a robot (e.g., Alpha Dog) is all the Weiqi piece dropping schemes conforming to rules that the Alpha Dog may take, and the strategy at this time is the behavior of the Alpha Dog, e.g., the Weiqi playing scheme that the Alpha Dog chooses when facing different situations.

The return value is a reward value acquired by the robot after executing the action, e.g., the return value is a reward value acquired based on the action of the robot in the reinforcement learning process. The purpose of reinforcement learning is to find an optimal strategy, so that the robot may send out a series of actions based on the found strategy, and the received cumulative reward value is the highest.

The target value is a preset target to be achieved by the robot, and in an embodiment of the disclosure, the target value may be multiple.

Step S402: Acquire an actual target value which is actually completed after executing an action corresponding to the action data.

Here, the actual target value refers to a target (e.g., a direction, a distance, a position in a given space) to be reached by the robot after executing the action corresponding to the action data, the target is the actual target value at the current time, and there may be a certain deviation between the actual target value and an expected target value (namely, the target value in the environment interaction data); when there is a deviation, learning needs to be continued so as to execute further actions to achieve the approaching of the actual target value to the expected target value.

Step S403: Determine a return value after executing the action according to the state data, the action data and the actual target value at the first time of the two adjacent times.

Here, a preset return function may be used to determine the return value after executing the action according to the state data, the action data and the actual target value at the first time of the two adjacent times.

The first time is a time before executing the action, and according to the state data before executing the action, the action data corresponding to the action to be executed by the robot, and the actual target value which is actually completed after executing the action, the deviation between the actual target value and the expected target value is determined, and then a current return value after executing the action is determined according to the deviation.

In some embodiments, when the target is completed, e.g., there is no deviation between the actual target value and the expected target value or the deviation is less than a threshold, the current return value is zero; when the target is not completed, e.g., the deviation between the actual target value and the expected target value is greater than or equal to the threshold, the current return value is −1.

Step S404: Update the return value in the environment interaction data by using the return value after executing the action to obtain updated environment interaction data.

Here, the return value after executing the action is cumulated with a return value corresponding to the robot's execution of a historical action, so as to update the return value in the environment interaction data and obtain the updated environment interaction data, the updated environment interaction data having new state data, new action data, new return values and new target values, where the new state data in the updated environment interaction data is the state data of a new environment which the robot enters after executing the action, for example, when the action executed by the robot is a transition, the new state data is then the position and attitude of the robot after the transition. The new action data is action data corresponding to an action to be executed next step determined by the robot according to a new return value after executing the action, where the result after a plurality of successive actions are finally executed is to make a final result closer to an expectant target value. The new return value is an accumulated return value between the return value after executing the action and the return value corresponding to that the robot executes the historical action.

For example, when the robot is to complete a target, it is possible that the current action does not complete a given target, but completes other targets. Then, after the robot completes the current action, it reselects a target from a hindsight angle. The second target is different from the first target. The second target is basically the target that may be achieved by the robot. For example, if the previously determined target may be too high, a lower target is determined for the second time, e.g., through multiple executions, the expected target value finally intended to be reached is achieved.

Step S405: Train an agent corresponding to a robot control network by using the updated environment interaction data.

In this embodiment of the disclosure, while training the agent by using the updated environment interaction data, the agent may also be trained at the same time by using the environment interaction data before the update, that is to say, the agent is trained by using the environment interaction data before and after the update at the same time, so that hindsight experience replay is used to improve the utilization rate of the failure data (namely, environment interaction data when the expected target value is not successfully reached historically), and training of robot tasks is accelerated.

Step S406: Control the action of a target robot by using the trained agent.

Here, after the agent is trained, the trained agent may be used to control the action of the target robot, so that the target robot may perform a specific action based on the control of the agent.

The robot control method provided by this embodiment of the disclosures may acquire the environment interaction data, the environment interaction data at least including the state data, the action data, the return values and the target values at two adjacent times; determine the return value after executing the action according to the state data, the action data, and the actual action target value after executing the action at the first time of the two adjacent times, and update the return value in the environment interaction data. Accordingly, the utilization rate of data is increased in the way of hindsight experience replay, which speeds up the training of the agent, and since the environment interaction data includes the target value, a large number of targets may be trained at the same time, and all the tasks in a certain target space may be completed by a model.

In some embodiments, a robot control system includes a robot, an agent and a server, where the robot may achieve any action, such as grasping, moving, etc., and the agent may achieve any target in a target space according to a learned policy, namely, the robot is controlled so that the robot achieves an action corresponding to a specific target.

Figure 5:
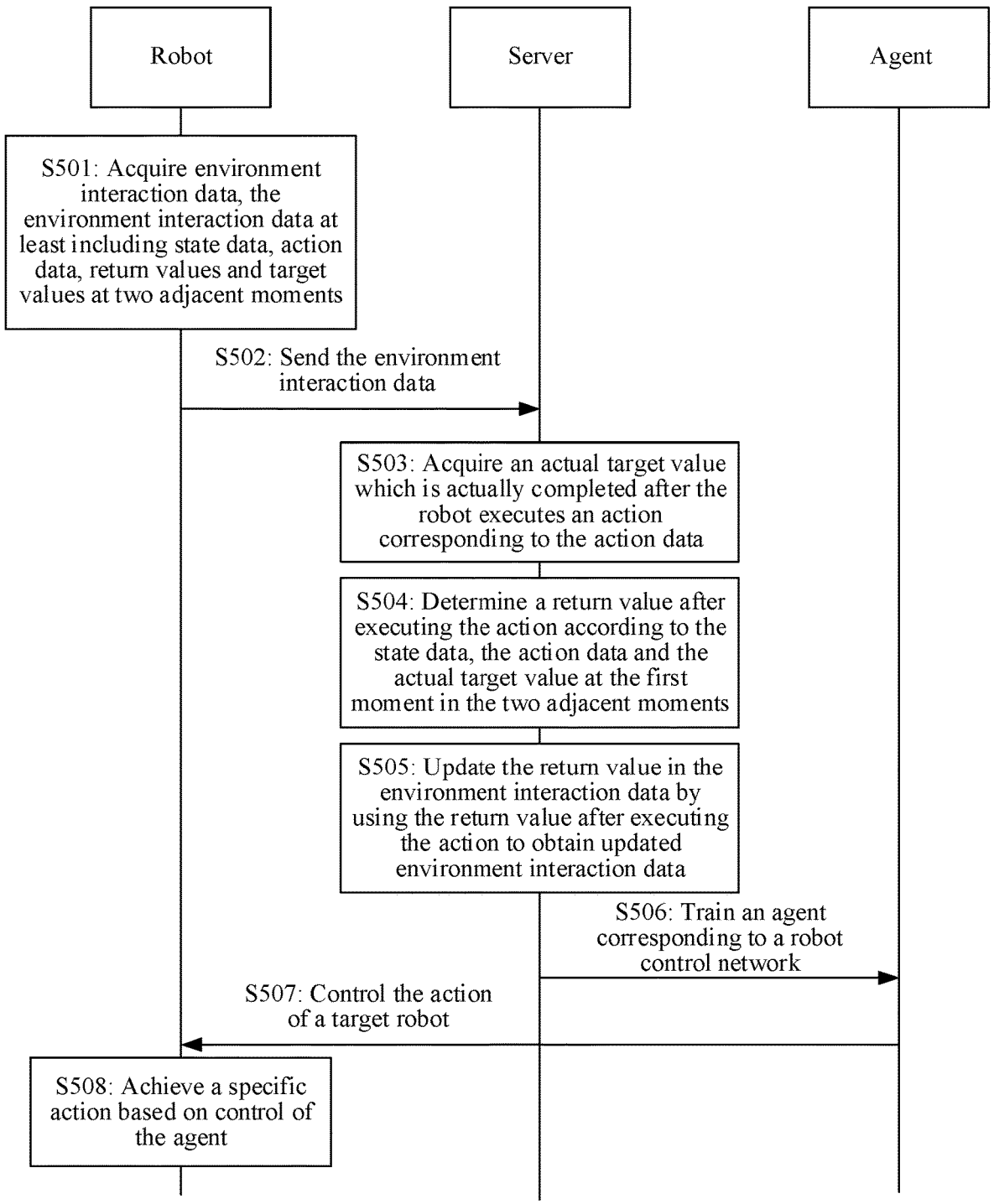
FIG. 5 is a schematic flowchart of a robot control method provided by an embodiment of the disclosure.

The robot control method provided by this embodiment of the disclosure continues to be described below, the robot control method being implemented by a terminal and a server in cooperation; FIG. 5 is a schematic flowchart of the robot control method provided by this embodiment of the disclosure, and as shown in FIG. 5, the method includes the following steps.

Step S501: Acquire, by the robot, environment interaction data, the environment interaction data at least including state data, action data, return values and target values at two adjacent times.

Here, the environment interaction data may be collected by sensors carried by the robot itself, or the robot may acquire environment interaction data collected by external sensors.

Step S502: Send, by the robot, the acquired environment interaction data to the server.

Step S503: Acquire, by the server, an actual target value which is actually completed after the robot executes an action corresponding to the action data.

Step S504: Determine, by the server, a return value after executing the action according to the state data, the action data and the actual target value at the first time in the two adjacent times.

Step S505: Update, by the server, the return value in the environment interaction data by using the return value after executing the action to obtain updated environment interaction data.

Step S506: Train, by the server, an agent corresponding to a robot control network by using the updated environment interaction data.

Steps S503 to S506 are the same as steps S402 to S405 described above, and will not be described in detail in this embodiment of the disclosure.

In this embodiment of the disclosure, the agent may be a software module in the server, and may also be a hardware structure independent from the server; the server obtains the agent capable of effectively and accurately controlling the robot by training the agent, and uses the trained agent to control the robot, so that the problem of network resource waste caused by that the server controls the robot in real time may be avoided.

Step S507: Control the action of a target robot by using the trained agent.

Step S508: Implement, by the robot, a specific action based on the control of the agent.

An example embodiment of the disclosure may train the agent based on the reinforcement learning technology, and therefore, through gradual training and learning, the trained agent may accurately control the robot, and the robot may accurately achieve the target expected by the user, so as to improve the working efficiency and working quality of the robot. In addition, in industrial production, robots may be used to replace manual operation in many cases, therefore, using the agent obtained by reinforcement learning and training may perform control of the robot with the same action as manual operation, and improve industrial production efficiency and production accuracy.

Figure 6:
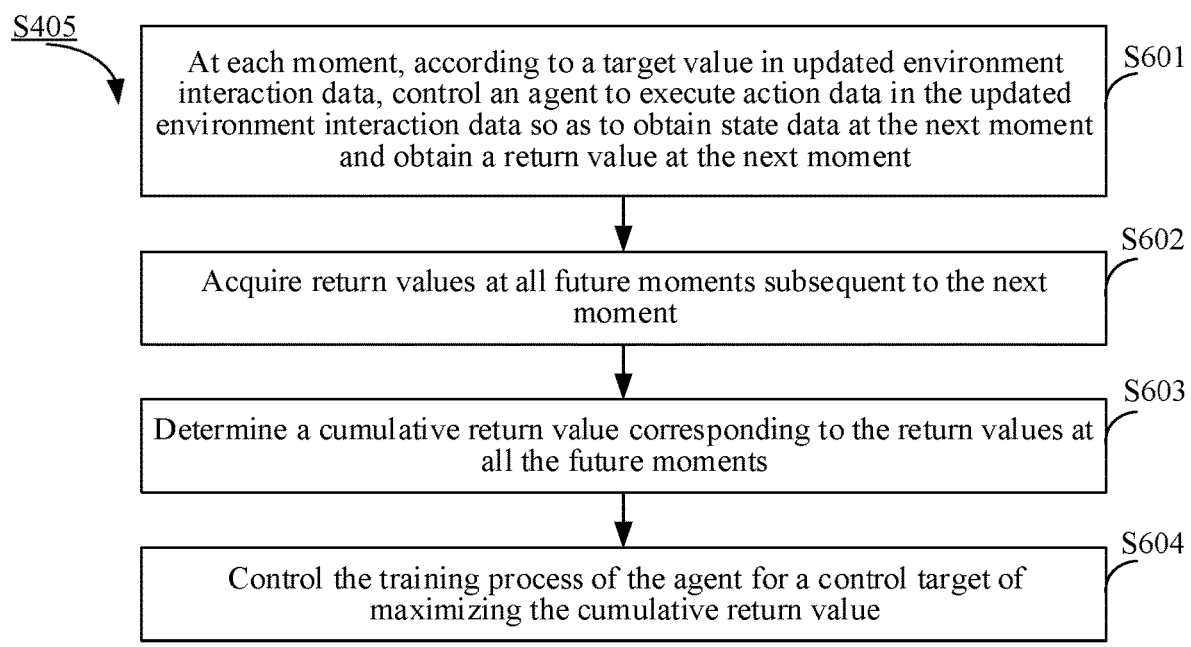
FIG. 6 is a schematic flowchart of a robot control method provided by an embodiment of the disclosure.

Based on FIG. 4, FIG. 6 is a schematic flowchart of a robot control method provided by an example embodiment of the disclosure, and as shown in FIG. 6, step S405 shown in FIG. 4 may be achieved by the following steps.

Step S601: At each time, according to a target value in updated environment interaction data, control an agent to execute action data in the updated environment interaction data so as to obtain state data at the next time and obtain a return value at the next time;

Here, since the robot will execute an action corresponding to action data in environment interaction data at a current time at each time, after executing the action at each time, a return value will be obtained, and the return value will be superposed to (or cumulated with) a return value in the environment interaction data at the current time, and other data in the environment interaction data will be updated at the same time, namely, as the robot continuously executes the action, a process of performing iterative optimization on different data in the environment interaction data is realized.

Step S602: Acquire return values at all future times (or a plurality of future times) subsequent to the next time.

Here, the return value at the future time refers to an expected return value expected to be obtained. The expected return value at each future time subsequent to the next time may be preset, where the expected return value corresponds to an expected target value.

Step S603: Determine a cumulative return value corresponding to the return values at all the future times.

Here, the cumulative return value refers to a cumulative sum of expected return values at the future times.

Step S604: Control the training process of the agent for a control target of maximizing the cumulative return value.

Here, the agent may be trained so as to maximize the cumulative return value.

In this embodiment of the disclosure, the training of the agent is realized based on a foresight experience replay technology, and the purpose of maximizing the cumulative return value is to maximize the expected return value at the future time, so as to ensure that the action of the robot may be closer to the expected target value.

In some embodiments, step S604 may be implemented in the following manner.

Step S6041: Determine an expected cumulative return of the cumulative return value. Step S6042: Calculate an initial action value function according to the expected cumulative return. Step S6043: Expand the initial action value function by using the environment interaction data at a plurality of successive times to obtain an expanded initial action value function, so as to accelerate the learning of the initial action value function and control the training process of the agent.

Here, in step S6043, the initial action value function may be expanded by using the foresight experience replay to accelerate the learning of the initial action value function to control the training process of the agent.

In some embodiments, step S6043 may be implemented in the following manner. Acquiring an expected return value at each future time of the plurality of successive future times subsequent to the current time and a preset discount factor; and then, obtaining the expanded initial action value function according to the discount factor and the expected return value at each future time.

In some embodiments, step S6043 may also be implemented in the following manner. Acquiring a weight of the initial action value function; where the value of the weight is greater than 0 and less than 1; then, through foresight experience replay, the initial action value function is expanded based on the weight by using the environment interaction data at the plurality of successive future times, and the expanded initial action value function is obtained.

Here, expanding the initial action value function based on the weight may be implemented by the following formula (1-1):

$$Q_{target}^{(n)}(\lambda) = \frac{\sum_{i=1}^{n} \lambda^i Q_{target}^{(i)}}{\sum_{i=1}^{n} \lambda^i};$$

(1-1)

where, $Q_{target}^{(n)}(\lambda)$ represents an initial action value function in expanding by n steps based on the weight $\lambda$, and $Q_{target}^{(i)}$ represents the initial action value function.

Figure 7:
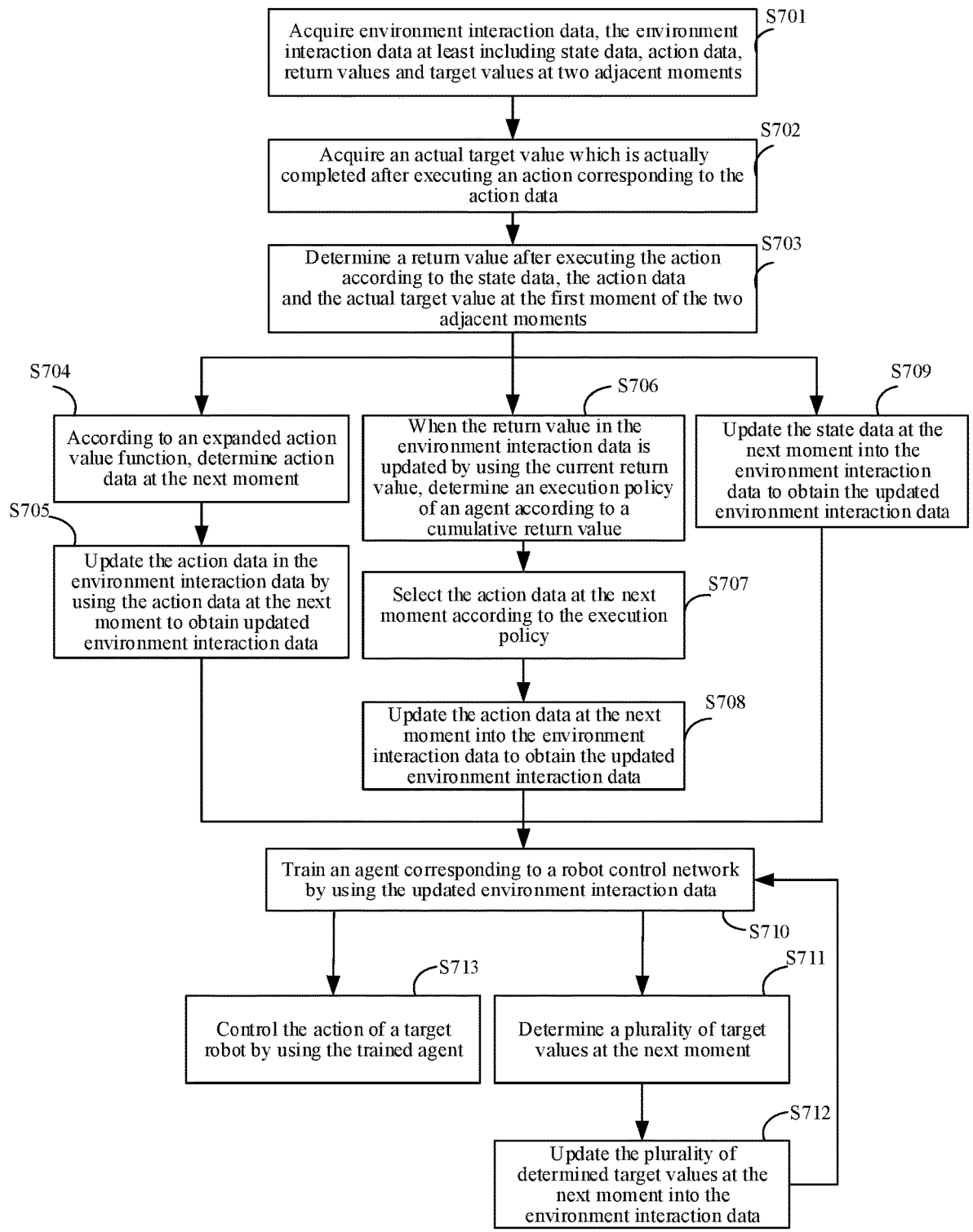
FIG. 7 is a schematic flowchart of a robot control method provided by an embodiment of the disclosure.

FIG. 7 is a schematic flowchart of a robot control method provided by an embodiment of the disclosure, and as shown in FIG. 7, the method includes the following steps.

Step S701: Acquire environment interaction data, the environment interaction data at least including state data, action data, return values and target values at two adjacent times.

Step S702: Acquire an actual target value which is actually completed after executing an action corresponding to the action data.

Step S703: Determine a return value after executing the action according to the state data, the action data and the actual target value at the first time of the two adjacent times.

The first time is a time before executing the action, and according to the state data before executing the action, the action data corresponding to the action to be executed by the robot, and the actual target value which is actually completed after executing the action, the deviation between the actual target value and the expected target value is determined, and then a current return value after executing the action is determined according to the deviation.

Step S704: According to an expanded action value function, determine action data at the next time.

Step S705: Update the action data in the environment interaction data by using the action data at the next time to obtain updated environment interaction data.

In this embodiment of the disclosure, after obtaining the action value function, one action capable of increasing the return value is selected from a plurality of actions as a target action, and action data corresponding to the target action is updated into the environment interaction data as the action data at the next time, so as to further update the action data.

Step S706: When the return value in the environment interaction data is updated by using the current return value, determine an execution policy of an agent according to a cumulative return value.

Step S707: Select the action data at the next time according to the execution policy.

Step S708: Update the action data at the next time into the environment interaction data to obtain the updated environment interaction data.

In some embodiments, after the agent (or robot) executes an action at the next time, a state of the environment in which the agent (or robot) is currently located transitions to a state at the next time, where the state at the next time corresponds to state data at the next time; correspondingly, the method further includes the following steps.

Step S709: Update the state data at the next time into the environment interaction data to obtain the updated environment interaction data.

Step S710: Train an agent corresponding to a robot control network by using the updated environment interaction data.

In this embodiment of the disclosure, when updating the environment interaction data, each data in the environment interaction data is updated at the same time, so that when using the updated environment interaction data to train an agent, it may be ensured that the action determined by the agent at the next time is close to the expected target value.

In some embodiments, the target values in the environment interaction data are multiple, and correspondingly, the method further includes the following steps.

Step S711: Determine a plurality of target values at the next time.

Step S712: Update the plurality of determined target values at the next time into the environment interaction data.

Step S713: Control the action of a target robot by using the trained agent.

According to the robot control method provided by this embodiment of the disclosure, the target values in the environment interaction data are multiple, so that multiple targets may be trained at the same time, namely, a large number of targets may be trained at the same time, so that one model may complete all the tasks in a certain target space. For example, the plurality of targets may include: the direction of movement being Y, the movement distance being X, a specific object being grasped during the movement, and after the specific object is grabbed, lifting the specific object, etc. It may be seen therefrom that the multiple targets may be consecutive actions in a series of actions, e.g., all tasks in the target space are realized by a model, thereby completing the execution of a series of actions, and making the robot more intelligent.

The following describes an exemplary application of this embodiment of the disclosure in an actual application scenario.

The robot control method provided by this embodiment of the disclosure may be applied to a multi-target robot task, e.g., it is required to place specified items to different locations in space (e.g., logistics, robot sorting, and other scenarios), and the robot (aircraft/unmanned vehicle) moves to specified locations, etc.

Before explaining the method of this embodiment of the disclosure, the symbolic expressions involved in the disclosure are first explained:

reinforcement learning may be generally expressed as a Markov decision process (MDP), in this embodiment of the disclosure, a target-expanded MDP is used, MDP includes a six-membered group (S, A, R, P, γ, G), where S represents a state space, A represents an action space, R represents a return function, P represents a state transition probability matrix, γ represents a discount factor, and G represents a target space. The target space contains a set of all the targets to be achieved, e.g., the target space G includes a plurality of target values g to be achieved, each target value g corresponds to a target, and the target is a target to be achieved by reinforcement learning. The agent observes a state $s_t$ at each time (where, t represents a corresponding time), and performs an action $a_t$ according to the state, the environment transitions to the next state $s_{t+1}$ after receiving the action $a_t$, and feeds back a return $r_t$, and the target of reinforcement learning optimization is to maximize a cumulative return value $\Sigma_{k=0}^{\infty}(\gamma^k r_{t+k})$. The agent selects the action based on the policy $\pi(a_t|s_t)$, and the action value function $Q(s_t,a_t)$ represents an expected cumulative return after the state $s_t$ executes the action $a_t$.

Where, $Q(s_t,a_t)=E[\Sigma_{k=0}^{\infty}(\gamma^k r_{t+k})]$, E represents solving an expected value.

In multi-target reinforcement learning, the policy of the agent and the return function are both regulated by the target g, and the return function, the value function and the policy have the following expressions: $r(s_t,a_t,g)$ $Q(s_t,a_t,g)$, and $\pi(s_t,g)$. In the embodiments of the disclosure, whether succeeding or not may be used to set the return function, namely, when a target is completed, the return is 0, and when the target is not completed, the return is −1; and φ is used for representing mapping from a state to the target, ε represents a set threshold for reaching the target, the return function may be represented by the following formula (2-1):

$$r(s_t, a_t, g) = \begin{cases} 0, & \|\phi(s_t) - g\|_2^2 < \varepsilon \\ -1, & \text{otherwise} \end{cases} \quad (2\text{-}1)$$

In the embodiments of the disclosure, a deep deterministic policy gradient algorithm (DDPG) is implemented based on an Actor Critic architecture, where a Critic part evaluates state actions, and an Actor part is a policy for selecting actions. Under the setting of multi-target reinforcement learning, the loss functions $L_{actor}$, $L_{critic}$ of the Actor part and the Critic part are calculated through the following equations (2-2) to (2-4), respectively:

$$L_{actor} = -E_{s_t \sim d^\pi}[Q(s_t,\pi(s_t,g),g)] \quad (2\text{-}2);$$

$$L_{critic} = E_{s_t \sim d^\pi}(Q_{target} - Q(s_t,a_t,g))^2 \quad (2\text{-}3);$$

$$\text{where } Q_{target} = r_t + \gamma Q(s_{t+1},\pi(s_{t+1},g),g) \quad (2\text{-}4).$$

In the embodiments of the disclosure, the foresight experience replay refers to using continuous multi-step data to expand an action value function (namely, the above-mentioned initial action value function) on the basis of the update of a general off-line policy algorithm, so as to accelerate the learning of the action value function. That is, the agent is allowed to have a field of view for looking forward, and a calculation formula instantly replaces $Q_{target}$ in the above formula with a formula (2-5) expanded in n steps:

$$Q_{target}^{(n)} = r_t + \gamma r_{t+1} + \ldots + \gamma^n Q(s_{t+1},\pi(s_{t+1},g),g) \quad (2\text{-}5).$$

Although the method of this embodiment of the disclosure may speed up the learning of the value function, if it is applied to an off-line policy algorithm, such as the DDPG used herein, an off-line policy deviation will be introduced.

Figure 8:
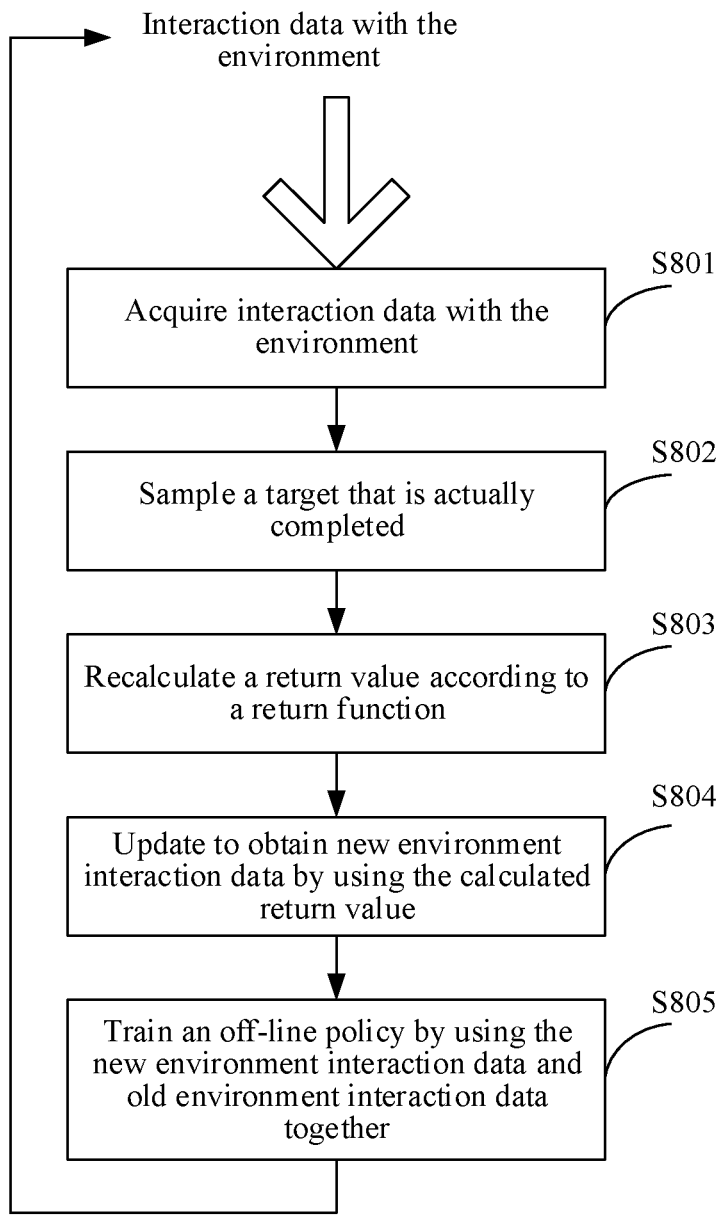
FIG. 8 is a flowchart of a method incorporating hindsight experience replay provided by an embodiment of the disclosure.

Hindsight experience replay refers to replacing the target in failure experience with the actually completed target in multi-target reinforcement learning, which is a kind of "be wise after the event" method. The hindsight experience replay brings a field of view for looking backward and may greatly improve the utilization efficiency of data. As shown in FIG. 8, a flowchart of a method of incorporating hindsight experience replay provided by an example embodiment of the disclosure includes the following steps.

Step S801: Acquire interaction data with the environment (namely, environment interaction data) $(s_t,a_t,r_t,s_{t+1},g)$.

Step S802: Sample a target that is actually completed g'.

Step S803: Recalculate a return value $r_t'=r(s_t,a_t,g')$ according to a return function.

Step S804: Update to obtain new environment interaction data $(s_t, a_t, r_t', s_{t+1}, g')$ by using the calculated return value $r_t'$.

Step S805: Train an off-line policy by using the new environment interaction data and old environment interaction data together.

Embodiments of the disclosure provide a multi-target reinforcement learning robot control technology incorporating foresight and hindsight, which may increase the training speed and greatly improve the utilization efficiency of data, and may save a large amount of unnecessary physical/simulation experimental data in a robot scenario. Furthermore, directly combining the foresight experience replay into the hindsight experience replay (HER) in n steps will be influenced by the off-line policy deviation, and the weighted average of n-step with exponentially decreasing weights may be used, which mitigates the influence of the off-line policy deviation. According to a weighting method with a weight λ provided by an embodiment of the disclosure, $Q_{target}^{(n)}(\lambda)$ may be calculated by the following equations (2-6):

$$Q_{target}^{(n)}(\lambda) = \frac{\sum_{i=1}^{n} \lambda^i Q_{target}^{(i)}}{\sum_{i=1}^{n} \lambda^i}. \quad (2\text{-}6)$$

In the method of this embodiment of the disclosure, when the weight λ approaches 0, $Q_{target}^{(n)}(\lambda)$ is expanded approaching one step, $Q_{target}^{(n)}(\lambda)$ has no off-line deviation at this time, but foresight information is not used, and when λ increases, $Q_{target}^{(n)}(\lambda)$ will contain more n-step foresight information, but more deviation will be brought at the same time, and therefore, λ may achieve the function of weighing foresight return information and the off-line deviation. By adjusting λ and the number of steps n, the foresight return information may be better utilized.

Figure 9:
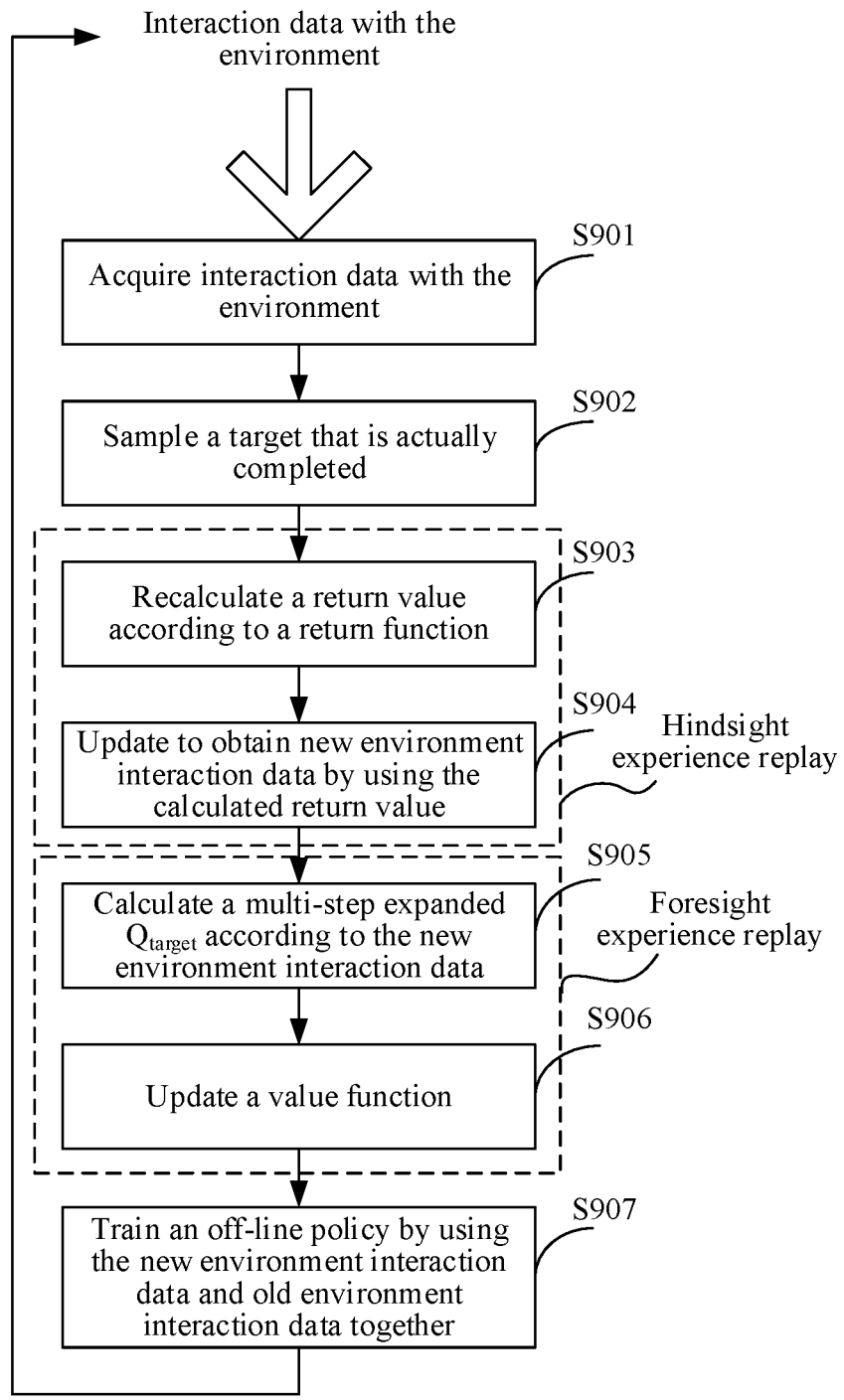
FIG. 9 is a flowchart of a method incorporating foresight and hindsight experience replay provided by an embodiment of the disclosure.

FIG. 9 is a flowchart of a method of incorporating foresight and hindsight experience replay provided by an embodiment of the disclosure, where the method includes the following steps.

Step S901: Acquire interaction data with the environment (namely, environment interaction data) $(s_t, a_t, r_t, s_{t+1}, g)$.

Step S902: Sample a target that is actually completed g'.

Step S903: Recalculate a return value $r_t'=r(s_t, a_t, g')$ according to a return function.

Step S904: Update to obtain new environment interaction data ($s_t$, $a_t$, $r_t'$, $s_{t+1}$, g') by using the calculated return value $r_t'$.

Here, steps S903 to S904 are hindsight experience replay.

Step S905: Calculate a multi-step expanded $Q_{target}$ according to the new environment interaction data.

Step S906: Calculate $Q_{target}^{(n)}(\lambda)$ to update a value function.

Here, steps S905 to S906 are foresight experience replay.

Step S907: Train an off-line policy by using the new environment interaction data and old environment interaction data together.

The robot control method provided by this embodiment of the disclosure may be applied to multi-target robot control, which greatly improves the utilization efficiency of data and increases the training speed; at the same time, we may learn the policy to complete the entire target space, and the generalization is higher.

Table 1 below is a comparison between the implementation results of the method of an example embodiment of the disclosure and the method in the related art, and tests are respectively performed by using eight tasks of Fetch and Hand of a simulation environment, Fetch representing an operating mechanical arm, and Hand representing an operating mechanical hand, where DDPG represents the method in the related art, n-step DDPG represents foresight experience replay, HER represents hindsight experience replay, and MHER represents a method combining foresight with hindsight provided in an example embodiment of the disclosure; the result of comparison is the average success rate of completing the task after the training is completed for the same number of times (on Fetch), and it may be seen from Table 1 that the method of this embodiment of the disclosure performs optimally under the same number of times of training.

TABLE 1

Comparison of the implementation results of the method of an example embodiment of the disclosure and the method in the related art

| | FetchReach | FetchPush | FetchSlide | FetchPick | HandReach | HandBlock | HandEgg | HandPen |
|---|---|---|---|---|---|---|---|---|
| DDPG | 100% | 7.2% | 2.3% | 4.6% | 0.0% | 0.0% | 0.0% | 0.2% |
| n-step DDPG | 100% | 12.3% | 6.5% | 6.1% | 0.0% | 0.0% | 0.0% | 0.0% |
| HER | 100% | 99.5% | 54.7% | 87.2% | 46.3% | 67.5% | 24.4% | 14.3% |
| MHER | 100% | 99.8% | 66.8% | 94.5% | 70% | 70% | 19.7% | 23.0% |

Figure 10A:
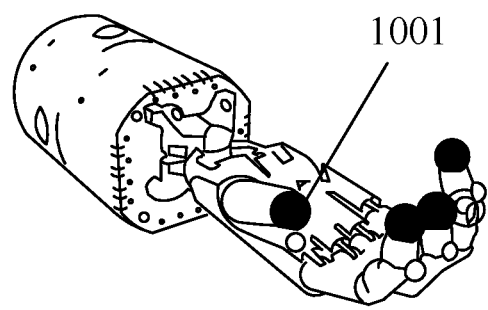
FIG. 10A to FIG. 10H are schematic diagrams of test procedures under different tasks by using the method of example embodiments of the disclosure.
Figure 10B:
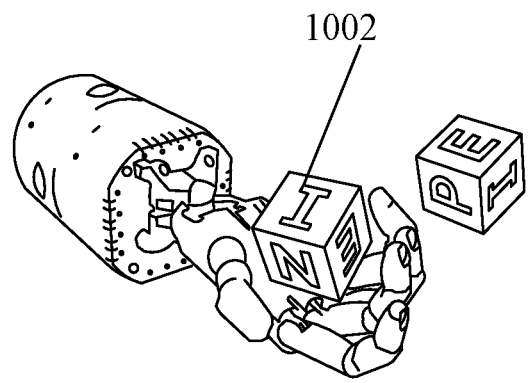
Figure 10C:
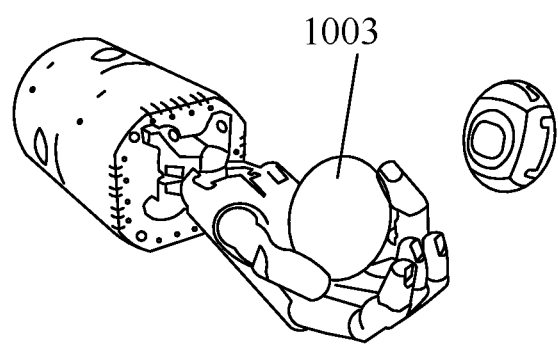
Figure 10D:
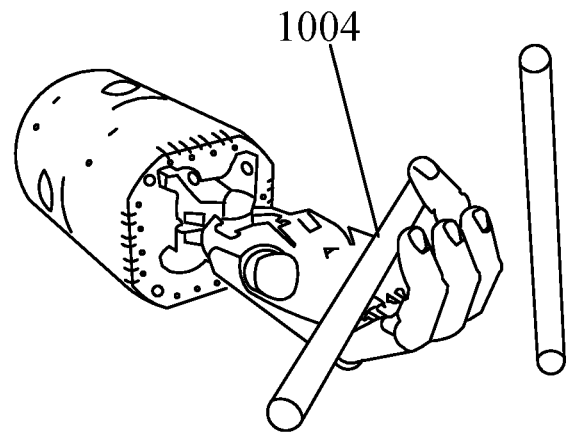
Figure 10E:
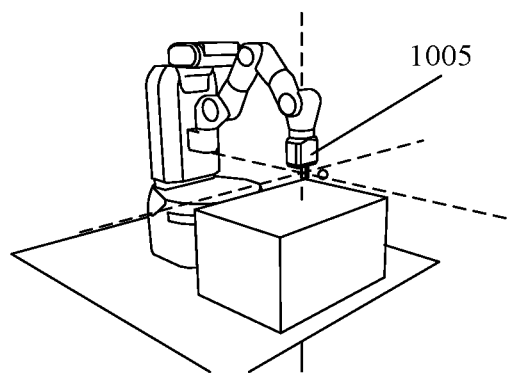
Figure 10F:
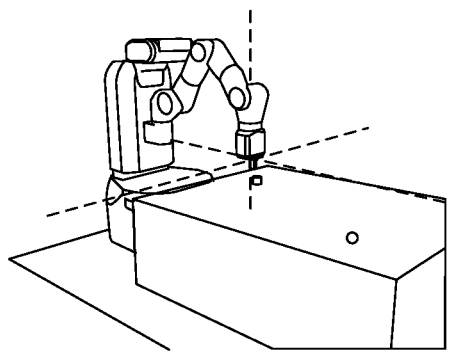
Figure 10G:
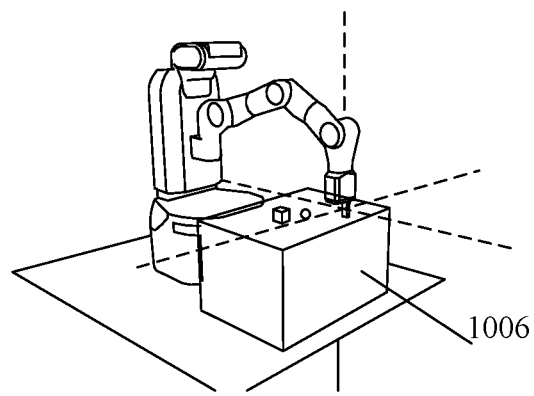
Figure 10H:
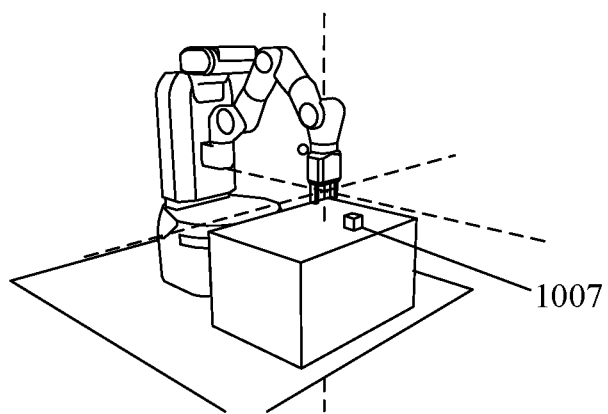

FIG. 10A to FIG. 10H are schematic diagrams of a test procedure under different tasks by using the method of this embodiment of the disclosure, where FIG. 10A is a HandReach, where reaching is achieved by necessarily using a hand with a shadow 1001 through its thumb and a selected finger until they meet at a target position above the palm. FIG. 10B is a HandBlock, a hand necessarily manipulating a block 1002 until it reaches an expected target position, and the block 1002 being rotated at a target position. FIG. 10C is a HandEgg, a hand necessarily manipulating an egg 1003 or sphere until it reaches a desired target position, and the egg 1003 or sphere being rotated at a target position. FIG. 10D is a HandPen, a hand necessarily manipulating a pen 1004 or stick until it reaches a desired target position, and the pen 1004 or stick being rotated at a target position. FIG. 10E is a FetchReach, an end effector 1005 of a robot having to be moved to a desired target position. FIG. 10F is a FetchSlide, a robot having to move in a certain direction such that it will slide and rest on a desired target. FIG. 10G is a FetchPush, a robot having to move one box 1006 until the box 1006 reaches a desired target position. FIG. 10H is a FetchPick, a robot having to pick up a box 1007 from a table with its gripper and moving the box 1007 to a target position on the table.

In addition to the weighted average multi-step expected return with the exponentially decreasing weight used in embodiment of the disclosure, the weight may be manually designed, or the foresight multi-step expected return (n-step return) may be used directly.

An exemplary structure in which the robot control apparatus 354 provided by this embodiment of the disclosure is implemented as a software module continues to be described below, in some embodiments, as shown in FIG. 3, the software module stored in the robotic control apparatus 354 of the memory 350 may be a robot control apparatus in the server 300, including:

a first acquiring module 3541, configured to acquire environment interaction data, the environment interaction data at least including state data, action data, return values and target values at two adjacent times; a second acquiring module 3542, configured to acquire an actual target value which is actually completed in executing an action corresponding to the action data; a determining module 3543, configured to determine a return value after executing the action according to the state data, the action data and the actual target value at the first time of the two adjacent times; an updating module 3544, configured to update the return value in the environment interaction data by using the return value after executing the action to obtain updated environment interaction data; a training module 3545, configured to train an agent corresponding to a robot control network by using the updated environment interaction data; and a control module 3546, configured to control the action of a target robot by using the trained agent.

In some embodiments, the training module is further configured to: at each time, according to the target value in the updated environment interaction data, control the agent to execute the action data in the updated environment interaction data so as to obtain state data at the next time and obtain a return value at the next time; acquire return values at all future times subsequent to the next time; determine a cumulative return value corresponding to the return values at all the future times; and control the training process of the agent for a control target of maximizing the cumulative return value.

In some embodiments, the training module is further configured to: determine an expected cumulative return of the cumulative return value; calculate an initial action value function according to the expected cumulative return; and expand the initial action value function by using the environment interaction data at a plurality of successive times to obtain an expanded initial action value function, so as to accelerate the learning of the initial action value function and control the training process of the agent.

In some embodiments, the training module is further configured to: acquire an expected return value at each future time of the plurality of successive future times subsequent to the current time and a preset discount factor; and obtain the expanded initial action value function according to the discount factor and the expected return value at each future time.

In some embodiments, the training module is further configured to: acquire a weight of the action value function; where, the value of the weight is greater than 0 and less than 1; expand the initial action value function based on the weight through foresight experience replay by using the environment interaction data at the plurality of successive future times to obtain the expanded initial action value function.

In some embodiments, expanding the initial action value function based on the weight is implemented through the following formula:

$$Q_{target}^{(n)}(\lambda) = \frac{\sum_{i=1}^{n} \lambda^i Q_{target}^{(i)}}{\sum_{i=1}^{n} \lambda^i};$$

where, $Q_{target}^{(n)}(\lambda)$ represents an action value function after expanding by n steps based on the weight $\lambda$, and $Q_{target}^{(t)}$ represents the initial action value function.

In some embodiments, the apparatus further includes: an action data determining module, configured to determine action data at a next time according to the expanded initial action value function; and a second updating module, configured to update the action data in the environment interaction data by using the action data at the next time to obtain updated environment interaction data; The training module is further configured to train an agent corresponding to a robot control network by using the updated environment interaction data.

In some embodiments, the apparatus further includes: an execution policy determining module, configured to determine an execution policy of the agent according to the cumulative return value when updating the return value in the environment interaction data by using the current return value; a selection module, configured to select the action data at the next time according to the execution policy; and a third updating module, configured to update the action data at the next time into the environment interaction data to obtain the updated environment interaction data.

In some embodiments, after the agent (or robot) executes the action, the state of the environment in which the agent (or robot) is currently located transitions to a state of the next time, where the state of the next time corresponds to state data at the next time; the apparatus further includes: a fourth updating module, configured to update the state data at the next time into the environment interaction data to obtain the updated environment interaction data.

In some embodiments, the target values are multiple, and the apparatus further includes: a simultaneous determining module, configured to simultaneously determine the plurality of target values at the next time when training the agent corresponding to the robot control network by using the updated environment interaction data; and a fifth updating module, configured to update the plurality of determined target values at the next time into the environment interaction data.

Descriptions of the foregoing apparatus embodiments in the disclosure are similar to the descriptions of the method embodiments. The apparatus embodiments have beneficial effects similar to those of the method embodiments and thus are not repeatedly described. Refer to descriptions in the method embodiments of the disclosure for technical details undisclosed in the apparatus embodiments of the disclosure.

An embodiment of the disclosure provides a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the robot control method provided in the embodiments of the disclosure.

An embodiment of the disclosure provides a storage medium storing executable instructions. The executable instructions, when being are executed by a processor, cause the processor to perform the robot control method provided in the embodiments of the disclosure, for example, the method shown in FIG. 4.

In some embodiments, the storage medium may be a computer-readable storage medium, such as a ferromagnetic random access memory (FRAM), a read only memory (ROM), a programmable read-only memory (PROM), an erasable programmable read-only memory (EPROM), an electrically erasable programmable read-only memory (EEPROM), a flash memory (Flash Memory), a magnetic storage, an optic disc, or a compact disc read-only memory (Compact Disc Read-Only Memory, CD-ROM); or may be any device including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts). In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The foregoing descriptions are merely embodiments of the disclosure and are not intended to limit the protection scope of the disclosure. Any modification, equivalent replacement, or improvement made without departing from the spirit and range of the disclosure shall fall within the protection scope of the disclosure.

What is claimed is:

1. A robot control method, the method being executed by a robot control device, the method comprising:
   acquiring environment interaction data, the environment interaction data at least comprising state data indicating a state of an environment in which a target robot is currently located, action data indicating an action to be executed by the target robot, return values and target values at two adjacent times, the return values being reward values to be acquired by the target robot after executing the action, the target values being preset targets to be reached by the target robot;
   acquiring an actual target value, indicating a target actually reached by executing the action corresponding to the action data;
   determining a return value in executing the action according to the state data, the action data, and the actual target value at a first time of the two adjacent times;
   updating the return value in the environment interaction data by using the return value in executing the action, to obtain updated environment interaction data;
   training an agent corresponding to a robot control network by using the updated environment interaction data; and
   controlling the action of the target robot by using the trained agent,
   wherein the training the agent comprises:
   expanding an initial action value function through foresight experience replay by using the updated environment interaction data at a plurality of successive future times, to obtain the expanded initial action value function; and
   controlling the training of the agent by using the expanded initial action value function.

2. The method according to claim 1, wherein the training the agent further comprises:
   at each time, according to a target value in the updated environment interaction data, controlling the agent to execute an action corresponding to action data in the updated environment interaction data, to obtain state data at a next time and obtain a return value at the next time;
   acquiring return values at a plurality of future times subsequent to the next time;
   determining a cumulative return value corresponding to the return values at the plurality of future times; and
   controlling the training of the agent with a target of maximizing the cumulative return value.

3. The method according to claim 2, wherein the expanding the initial action value function comprises:
   determining an expected cumulative return of the cumulative return value;
   calculating the initial action value function according to the expected cumulative return and expanding the calculated initial action value function.

4. The method according to claim 2, further comprising:
   determining an execution policy of the agent according to the cumulative return value in response to updating the return value in the environment interaction data by using a current return value;
   selecting action data at the next time according to the execution policy; and
   updating the action data at the next time into the environment interaction data to obtain the updated environment interaction data.

5. The method according to claim 1, wherein the expanding the initial action value function comprises:
   acquiring an expected return value at each future time of the plurality of successive future times subsequent to a current time and a preset discount factor; and
   obtaining the expanded initial action value function according to the preset discount factor and the expected return value at each future time.

6. The method according to claim 1, wherein the expanding the initial action value function comprises:
   acquiring a weight of the initial action value function, wherein a value of the weight is greater than 0 and less than 1; and
   expanding the initial action value function based on the weight through the foresight experience replay by using the environment interaction data at the plurality of successive future times, to obtain the expanded initial action value function.

7. The method according to claim 6, wherein the expanding the initial action value function based on the weight is performed through the following formula:

$$Q_{target}^{(n)}(\lambda) = \frac{\sum_{i=1}^{n} \lambda^i Q_{target}^{(i)}}{\sum_{i=1}^{n} \lambda^i};$$

wherein, $Q_{target}^{(n)}(\lambda)$ represents an initial action value function in expanding by n steps based on the weight $\lambda$, and $Q_{target}^{(i)}$ represents the initial action value function.

8. The method according to claim 1, further comprising:
   according to the expanded initial action value function, determining action data at a next time;
   updating the action data in the environment interaction data by using the action data at the next time to obtain the updated environment interaction data; and
   training the agent corresponding to the robot control network by using the updated environment interaction data.

9. The method according to claim 1, wherein the state of the environment in which the target robot is currently located transitions to a state at a next time according to the action executed by the target robot, the state at the next time corresponding to state data at the next time, and wherein the method further comprises updating state data at the next time into the environment interaction data to obtain the updated environment interaction data.

10. The method according to claim 1, wherein a plurality of target values exists for a next time, and the method further comprises:

during the training the agent corresponding to the robot control network by using the updated environment interaction data, simultaneously determining the plurality of target values at the next time;

updating the determined plurality of target values at the next time into the environment interaction data.

11. A robot control apparatus, comprising:

at least one memory configured to store program code; and at least one processor configured to read the program code and operate as instructed by the program code, the program code comprising:

first acquiring code configured to cause the at least one processor to acquire environment interaction data, the environment interaction data at least comprising state data indicating a state of an environment in which a target robot is currently located, action data indicating an action to be executed by the target robot, return values and target values at two adjacent times, the return values being reward values to be acquired by the target robot after executing the action, the target values being preset targets to be reached by the target robot;

second acquiring code configured to cause the at least one processor to acquire an actual target value, indicating a target actually reached by executing the action corresponding to the action data;

determining code configured to cause the at least one processor to determine a return value in executing the action according to the state data, the action data and the actual target value at a first time of the two adjacent times;

updating code configured to cause the at least one processor to update the return value in the environment interaction data by using the return value in executing the action to obtain updated environment interaction data;

training code configured to cause the at least one processor to train an agent corresponding to a robot control network by using the updated environment interaction data; and controlling code configured to cause the at least one processor to control the action of the target robot by using the trained agent, wherein the training code comprises expanding sub-code configured to cause the at least one processor to:

expand an initial action value function through foresight experience replay by using the updated environment interaction data at a plurality of successive future times, to obtain the expanded initial action value function; and control the training of the agent by using the expanded initial action value function.

12. The apparatus according to claim 11, wherein the training code comprises:

first training sub-code configured to cause the at least one processor to, at each time, according to a target value in the updated environment interaction data, controlling the agent to execute an action corresponding to action data in the updated environment interaction data, to obtain state data at a next time and obtain a return value at the next time;

acquiring sub-code configured to cause the at least one processor to acquire return values at a plurality of future times subsequent to the next time;

first determining sub-code configured to cause the at least one processor to determine a cumulative return value corresponding to the return values at the plurality of future times; and controlling sub-code configured to cause the at least one processor to control the training of the agent with a target of maximizing the cumulative return value.

13. The apparatus according to claim 12, wherein the expanding sub-code is configured to cause the at least one processor to expand the initial action value function by determining an expected cumulative return of the cumulative return value, calculating the initial action value function according to the expected cumulative return, and expanding the calculated initial action value function.

14. The apparatus according to claim 12, wherein the updating code comprises:

third determining sub-code configured to cause the at least one processor to determine an execution policy of the agent according to the cumulative return value in response to updating the return value in the environment interaction data by using a current return value;

selecting sub-code configured to cause the at least one processor to select action data at the next time according to the execution policy; and second updating sub-code configured to cause the at least one processor to update the action data at the next time into the environment interaction data to obtain the updated environment interaction data.

15. The apparatus according to claim 11, wherein the expanding sub-code is configured to cause the at least one processor to acquire an expected return value at each future time of the plurality of successive future times subsequent to a current time and a preset discount factor; and obtain the expanded initial action value function according to the preset discount factor and the expected return value at each future time.

16. The apparatus according to claim 11, wherein the expanding sub-code is configured to cause the at least one processor to acquire a weight of the initial action value function, wherein a value of the weight is greater than 0 and less than 1; and expand the initial action value function based on the weight through the foresight experience replay by using the environment interaction data at the plurality of successive future times, to obtain the expanded initial action value function.

17. The apparatus according to claim 16, wherein the expanding sub-code is configured to cause the at least one processor to perform the following formula:

$$Q_{target}^{(n)}(\lambda) = \frac{\sum_{i=1}^{n} \lambda^i Q_{target}^{(i)}}{\sum_{i=1}^{n} \lambda^i};$$

wherein, $Q_{target}^{(n)}(\lambda)$ represents an initial action value function in expanding by n steps based on the weight $\lambda$, and $Q_{target}^{(i)}$ represents the initial action value function.

18. The apparatus according to claim 11, wherein the updating code comprises:

second determining sub-code configured to cause the at least one processor to determine, according to the expanded initial action value function, action data at a next time; and first updating sub-code configured to cause the at least one processor to update the action data in the environment interaction data by using the action data at the next time to obtain the updated environment interaction data, and wherein the training code further comprises second training sub-code configured to cause the at least one processor to train the agent corresponding to the robot control network by using the updated environment interaction data.

19. The apparatus according to claim 11, wherein the state of the environment in which the target robot is currently located transitions to a state at a next time according to the action executed by the target robot, the state at the next time corresponding to state data at the next time, and wherein the updating code is configured to cause the at least one processor to update state data at the next time into the environment interaction data to obtain the updated environment interaction data.

20. A non-transitory computer-readable storage medium, storing an executable instruction, and configured to cause a processor, when executing the executable instruction, to perform:

acquiring environment interaction data, the environment interaction data at least comprising state data indicating a state of an environment in which a target robot is currently located, action data indicating an action to be executed by the target robot, return values and target values at two adjacent times, the return values being reward values to be acquired by the target robot after executing the action, the target values being preset targets to be reached by the target robot;

acquiring an actual target value, indicating a target actually reached in executing the action corresponding to the action data;

determining a return value in executing the action according to the state data, the action data, and the actual target value at a first time of the two adjacent times;

updating the return value in the environment interaction data by using the return value in executing the action, to obtain updated environment interaction data;

training an agent corresponding to a robot control network by using the updated environment interaction data; and controlling the action of the target robot by using the trained agent, wherein the training the agent comprises:

expanding an initial action value function through foresight experience replay by using the updated environment interaction data at a plurality of successive future times, to obtain the expanded initial action value function; and controlling the training of the agent by using the expanded initial action value function.

* * * * *